United States Patent
Chou et al.

(10) Patent No.: US 7,876,534 B2
(45) Date of Patent: Jan. 25, 2011

(54) MAGNETO-RESISTIVE EFFECT DEVICE OF THE CPP TYPE, AND MAGNETIC DISK SYSTEM

(75) Inventors: Tsutomu Chou, Tokyo (JP); Yoshihiro Tsuchiya, Tokyo (JP); Daisuke Miyauchi, Tokyo (JP); Kiyoshi Noguchi, Tokyo (JP)

(73) Assignee: TDK Corporation, Tokyo (JP)

( * ) Notice: Subject to any disclaimer, the term of this patent is extended or adjusted under 35 U.S.C. 154(b) by 520 days.

(21) Appl. No.: 12/014,575

(22) Filed: Jan. 15, 2008

(65) Prior Publication Data

US 2009/0180217 A1    Jul. 16, 2009

(51) Int. Cl.
*G11B 5/11* (2006.01)
*G11B 5/39* (2006.01)

(52) U.S. Cl. .................................... 360/319
(58) Field of Classification Search ................ 360/319, 360/324, 324.12
See application file for complete search history.

(56) References Cited

U.S. PATENT DOCUMENTS

| | | | |
|---|---|---|---|
| 5,576,914 A | | 11/1996 | Rottmayer et al. |
| 6,563,679 B1 * | | 5/2003 | Li et al. .................. 360/324 |
| 6,724,583 B2 | | 4/2004 | Seigler et al. |
| 7,027,272 B2 * | | 4/2006 | Furukawa et al. ...... 360/324.12 |
| 7,035,062 B1 * | | 4/2006 | Mao et al. .............. 360/324.2 |
| 7,036,208 B2 * | | 5/2006 | Ho et al. ................. 29/603.13 |
| 7,177,122 B2 | | 2/2007 | Hou et al. |
| 7,221,546 B2 * | | 5/2007 | Terunuma et al. ...... 360/324.12 |
| 7,333,304 B2 * | | 2/2008 | Gill et al. .............. 360/324.12 |
| 7,562,436 B2 * | | 7/2009 | Jayasekara ............. 29/603.13 |
| 7,599,151 B2 * | | 10/2009 | Hatatani et al. ............ 360/319 |
| 7,599,154 B2 * | | 10/2009 | Sbiaa et al. ............ 360/324.11 |
| 2005/0018367 A1 * | | 1/2005 | Terunuma et al. ...... 360/324.12 |
| 2007/0030603 A1 * | | 2/2007 | Sato et al. .................... 360/324 |

(Continued)

FOREIGN PATENT DOCUMENTS

JP        2001-331913        11/2001

(Continued)

OTHER PUBLICATIONS

U.S. Appl. No. 12/255,105, filed Oct. 21, 2008, Chou, et al.

(Continued)

*Primary Examiner*—Angel A. Castro
(74) *Attorney, Agent, or Firm*—Oblon, Spivak, McClelland, Maier & Neustadt, L.L.P.

(57) ABSTRACT

A magnetoresistive device comprising a magnetoresistive unit, an upper shield layer and a lower shield layer stacked such that the magnetoresistive unit is held between them. The magnetoresistive unit comprises a nonmagnetic metal intermediate layer, a first ferromagnetic layer and a second ferromagnetic layer stacked with the nonmagnetic metal intermediate layer in the middle. When no bias magnetic field is applied, the first and second ferromagnetic layers have mutually antiparallel magnetizations. The magnetoresistive unit further comprises first and second side shield layers, and first and second biasing layers located to be magnetically coupled to the first and second side shield layers, wherein magnetic fluxes fed from the bias magnetic fields pass through the first and second side shield layers positioned in proximity to the magnetoresistive unit such that the magnetizations of the first and second ferromagnetic layers become substantially orthogonal to each other.

11 Claims, 13 Drawing Sheets

U.S. PATENT DOCUMENTS

2007/0274011 A1    11/2007    Ohta et al.

FOREIGN PATENT DOCUMENTS

| JP | 2002-123912 | 4/2002 |
| JP | 2002-171013 | 6/2002 |
| JP | 2007-157281 | 6/2007 |
| JP | 2007-317269 | 12/2007 |

OTHER PUBLICATIONS

U.S. Appl. No. 11/968,911, filed Jan. 3, 2008, Tsuchiya, et al.
U.S. Appl. No. 11/856,438, filed Sep. 17, 2007, Shimazawa, et al.
U.S. Appl. No. 12/019,205, filed Jan. 24, 2008, Machita, et al.
U.S. Appl. No. 12/019,202, filed Jan. 24, 2008, Machita, et al.
U.S. Appl. No. 12/022,538, filed Jan. 30, 2008, Chou, et al.

* cited by examiner

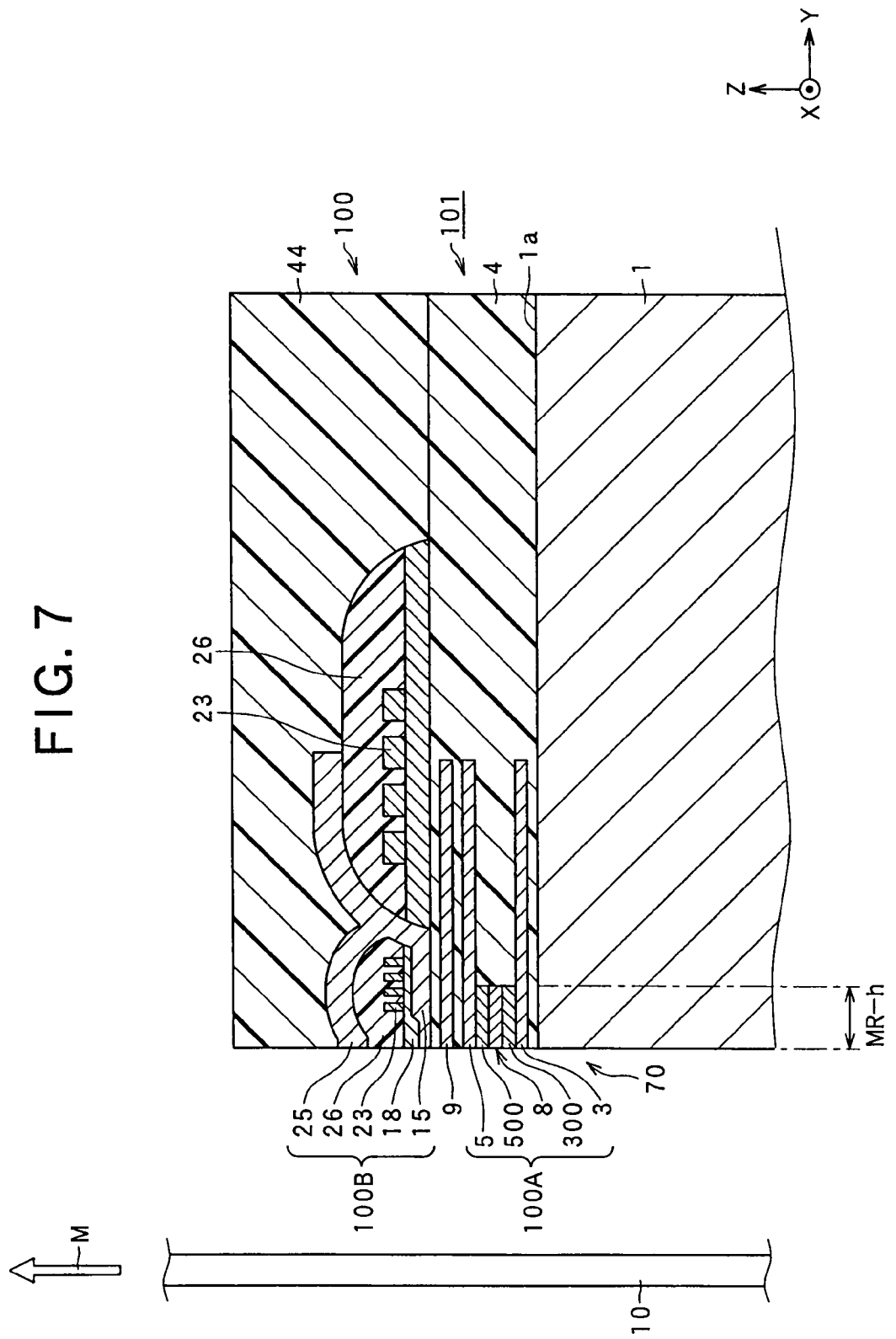

MAGNETO-RESISTIVE EFFECT DEVICE OF THE CPP TYPE, AND MAGNETIC DISK SYSTEM

BACKGROUND OF THE INVENTION

1. Field of the Invention

The present invention relates to a magnetoresistive device adapted to read the magnetic field intensity of magnetic recording media or the like as signals, a thin-film magnetic head comprising that magnetoresistive device, and a head gimbal assembly and a magnetic disk system, one each including that thin-film magnetic head.

2. Explanation of the Prior Art

In recent years, with an increase in the recording density of hard disks (HDDs), there have been growing demands for improvements in the performance of thin-film magnetic heads. For the thin-film magnetic head, a composite type thin-film magnetic head has been widely used, which has a structure wherein a reproducing head having a read-only magnetoresistive device (hereinafter often called the MR device for short) and a recording head having a write-only induction type magnetic device are stacked together.

With an increase in the recording density, there has been a growing demand for the reproducing device of a reproducing head to have narrower shield gaps and narrower tracks, and there is now a GMR device of the CPP (current perpendicular to plane) structure (CPP-GMR device) proposed in the art, in which upper and lower shield layers and a magnetoresistive device are connected electrically in series to make do without any insulating layer between the shields. This technology is thought of as inevitable to achieve such recording densities as exceeding 200 Gbits/in$^2$.

Such a CPP-GMR device has a multilayer structure comprising a first ferromagnetic layer and a second ferromagnetic layer between which an electroconductive, nonmagnetic intermediate layer is sandwiched. A typical multilayer structure for the spin valve type CPP-GMR device comprises, in order from a substrate side, a lower electrode/antiferromagnetic layer/first ferromagnetic layer/electroconductive, nonmagnetic intermediate layer/second ferromagnetic layer/upper electrode stacked together in order.

The direction of magnetization of the first ferromagnetic layer that is one of the ferromagnetic layers remains fixed such that when an externally applied magnetic field is zero, it is perpendicular to the direction of magnetization of the second ferromagnetic layer. The fixation of the direction of magnetization of the first ferromagnetic layer is achieved by the exchange coupling of it with an antiferromagnetic layer provided adjacent to it, whereby unidirectional anisotropic energy (also called the "exchange bias" or "coupled magnetic field") is applied to the first ferromagnetic layer. For this reason, the first ferromagnetic layer is also called the fixed magnetization layer. By contrast, the second ferromagnetic layer is also called the free layer. Further, if the fixed magnetization layer (the first ferromagnetic layer) is configured as a triple-layer structure of a ferromagnetic layer/nonmagnetic metal layer/ferromagnetic layer (the so-called "multilayer ferri-structure" or "synthetic pinned layer"), it is then possible to give a strong exchange coupling between two ferromagnetic layers, thereby effectively increasing the exchange coupling force from the antiferromagnetic layer, and reducing the influences on the free layer of a static magnetic field resulting from the fixed magnetization layer. Thus, the "synthetic pinned structure" is now in extensive use.

To meet the demands toward recent ultra-high recording densities, however, it is an essential requirement to diminish the "width" and "height" of the magnetoresistive device built in the reproducing (read) head.

To lower the height of the magnetoresistive device, viz., to make the device much thinner, U.S. Pat. Nos. 5,576,914, 6,724,583, 7,117,122, etc. have come up with a novel GMR device structure basically comprising a simple triple-layer structure of a ferromagnetic layer/nonmagnetic intermediate layer/ferromagnetic layer. According to those publications, under the action of a bias magnetic field, there is an initial state created in which the magnetizations of two magnetic layers are inclined about 45° with respect to the track width direction. Upon detection of a signal magnetic field from a medium in the initial state of the device, the directions of magnetization of the two magnetic layers change as if scissors cut paper, with the result that there is a change in the resistance value of the device. In the present disclosure, the GMR device of such structure may be called the "scissors type GMR device" for the sake of convenience.

One possible approach to the application of bias magnetic fields to the head structure using the aforesaid prior art "scissors type GMR device" is to place a permanent magnet 900 such as CoPt at the rear site of a device 800 as shown typically in FIG. 15. When such an arrangement is used, however, much of the magnetic flux generated from the permanent magnet 900 for the adjustment of the directions of magnetization of free layers 411 and 415 of the device 800 leaks out to the sides of upper and lower shield layers 901 and 905: the function that it should have to adjust the directions of magnetization tends to be in the wane. In other words, the permanent magnet 900 must be much larger than other parts. However, as the height of the device 800 grows low, there would be no option but to make the permanent magnet 900 thinner or lower: it would be very difficult to make sure the permanent magnet 900 has plenty of function of adjusting the directions of magnetization.

As device size grows small, it causes a decrease in the spacing between magnetic signals recorded in a magnetic recording medium, viz., bits, and likely interferences from neighboring bits would be an obstacle to the normal reading of magnetic signals.

The situations being like this, the present invention has been made for the purpose of providing a magnetoresistive device which makes it possible to adopt the structure capable of narrowing down the read gap (the gap between the upper and the lower shield) to meet recent mounting demands for ultra-high recording densities; and enables stable magnetic-field biasing layer (biasing layer) to be applied by way of a simplified structure and interferences from neighboring bits to be kept in check to make a magnetic signal profile so sharp that an effective device width can be narrowed down for the normal reading of magnetic signals, and a thin-film magnetic head comprising that magnetoresistive device as well as a head gimbal assembly and a magnetic disk system, one each comprising that magnetoresistive device.

SUMMARY OF THE INVENTION

To attain the aforesaid object, the invention provides a magnetoresistive device with a CPP (current perpendicular to plane) structure comprising a magnetoresistive unit, and an upper shield layer and a lower shield layer located and formed such that the magnetoresistive unit is held between them, with a sense current applied in a stacking direction, wherein said magnetoresistive unit comprises a nonmagnetic metal intermediate layer, and a first ferromagnetic layer and a second ferromagnetic layer stacked and formed such that the nonmagnetic metal intermediate layer is held between them; with no bias magnetic field applied as yet, said first ferromagnetic layer and second ferromagnetic layer have mutually antiparallel magnetizations; said magnetoresistive unit has a first side shield layer and a second side shield layer adjacent to both its widthwise sides, one each via an insulating layer; and at rear sites of said first and second side shield layers, first and second biasing layers are located in such a way as to be magnetically coupled to the first and second side shield layers, wherein magnetic fluxes fed from the first and second biasing layers pass through the first and second side shield layers, respectively, and then through the ends of the first and second side shield layers positioned in proximity to the magnetoresistive unit so that magnetic fluxes fed from said ends work such that the magnetizations of said first ferromagnetic layer and second ferromagnetic layer are substantially orthogonal to each other.

In a preferable embodiment of the magnetoresistive device of the invention, on a depth side of said magnetoresistive unit, there is a back yoke (flux guide) formed, enabling the substantially orthogonal magnetizations of said first and second ferromagnetic layers to be more effectively achieved, and the presence of said back yoke makes it possible for the magnetic fluxes fed from the ends of said first and second side shield layers positioned in proximity to the magnetoresistive unit to pass through the magnetoresistive unit to the depth side of the magnetoresistive unit.

In a preferable embodiment of the magnetoresistive device of the invention, said first and second biasing layers each have an N-S pole magnetized in a length direction.

In a preferable embodiment of the magnetoresistive device of the invention, on a depth side of said magnetoresistive unit there is a back yoke formed wherein said back yoke is magnetically coupled to the rear ends of the first and second biasing layers by way of the presence of a connecting yoke connected to the rear end of said back yoke, and the magnetic fluxes fed from the first and second biasing layers pass through the first and second side shield layers, respectively, and then through the ends of the first and second side shield layers positioned in proximity to the magnetoresistive unit, and the magnetic fluxes fed from the ends of said first and second side shield layers pass through the magnetoresistive unit, back yoke and connecting yoke, respectively, forming a closed magnetic path going back to the first and second biasing layers.

In a preferable embodiment of the magnetoresistive device of the invention, each of the ends of said first and second side shield layers positioned in proximity to the magnetoresistive unit is configured in a shape having a narrowed sectional area to converge the fed magnetic flux.

In a preferable embodiment of the magnetoresistive device of the invention, a gap spacing defined by a gap between said upper shield layer and said lower shield layer is up to 30 nm.

In a preferable embodiment of the magnetoresistive device of the invention, the substantially orthogonal magnetizations of said first ferromagnetic layer and second ferromagnetic layer occur in the range of $90°\pm15°$.

In a preferable embodiment of the magnetoresistive device of the invention, said first and second biasing layers have a width (X-direction) narrower than that (X-direction) of said first and second side shield layers.

The invention also provides a thin-film magnetic head, comprising a medium opposite plane in opposition to a recording medium, and the aforesaid magnetoresistive device, which is located near said medium opposite plane to detect a signal magnetic field from said recording medium.

Further, the invention provides a head gimbal assembly, comprising a slider that includes the aforesaid thin-film magnetic head and is located in opposition to a recording medium, and a suspension adapted to resiliently support said slider.

Yet further, the invention provides a magnetic disk system, comprising a slider that includes the aforesaid thin-film magnetic head and is located in opposition to a recording medium, and a positioning device adapted to support and position said slider with respect to said recording medium.

BRIEF EXPLANATION OF THE DRAWINGS

FIG. 7 is illustrative in section of the thin-film magnetic head parallel with the so-called air bearing surface (ABS).

DETAILED EXPLANATION OF THE PREFERRED EMBODIMENTS

Figure 1:
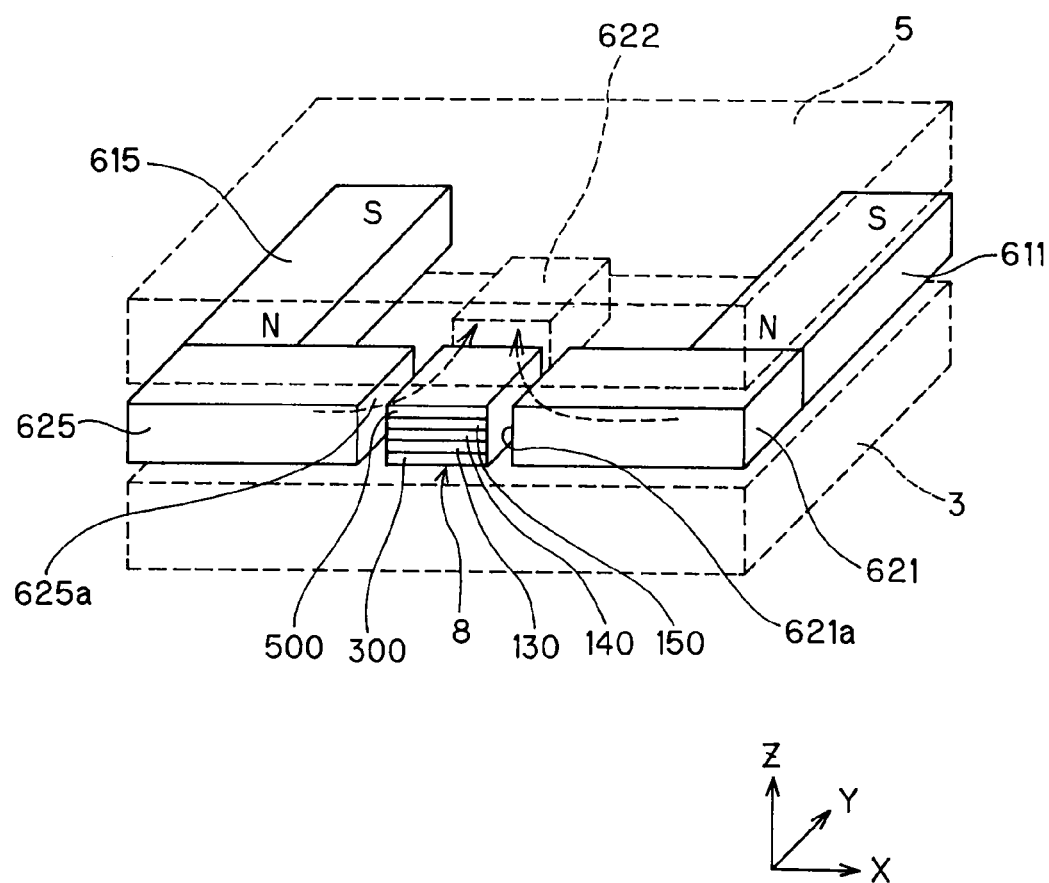
FIG. 1 is illustrative in perspective of the magnetoresistive device according to an embodiment of the invention, as viewed from the ABS (air bearing surface) direction.

The best mode for carrying out the invention is now explained in greater details.

The magnetoresistive device of the invention is preferably used with a thin-film magnetic head in general and a reproducing head in particular.

In the following disclosure of the invention, the sizes of each device component in the X-, Y- and Z-axis directions shown in the drawings will be referred to as the "width", "length" and "thickness", respectively. The side of the device nearer to the air bearing surface (the plane of the thin-film magnetic head in opposition to the recording medium) in the Y-axis direction will be called "forward" and the opposite side (depth side) will be called "rearward", and the direction of stacking the individual films up will be called "upward" or "upper side" and the opposite direction will be called "downward" or "lower side".

FIG. 1 is illustrative in perspective of the magnetoresistive device according to an embodiment of the invention, as viewed from the ABS (air bearing surface) direction. The ABS is generally corresponding to a plane (hereinafter often called the medium opposite plane) at which a reproducing head is in opposition to a recording medium; however, it is understood that the ABS here includes even a section at a position where the multilayer structure of the device can be clearly observed. For instance, a protective layer of DLC (the protective layer adapted to cover the device) or the like, in a strict sense, positioned facing the medium opposite plane may be factored out, if necessary. In a broader concept, the magnetoresistive device here includes shield layers that are located above and below.

Figure 2:
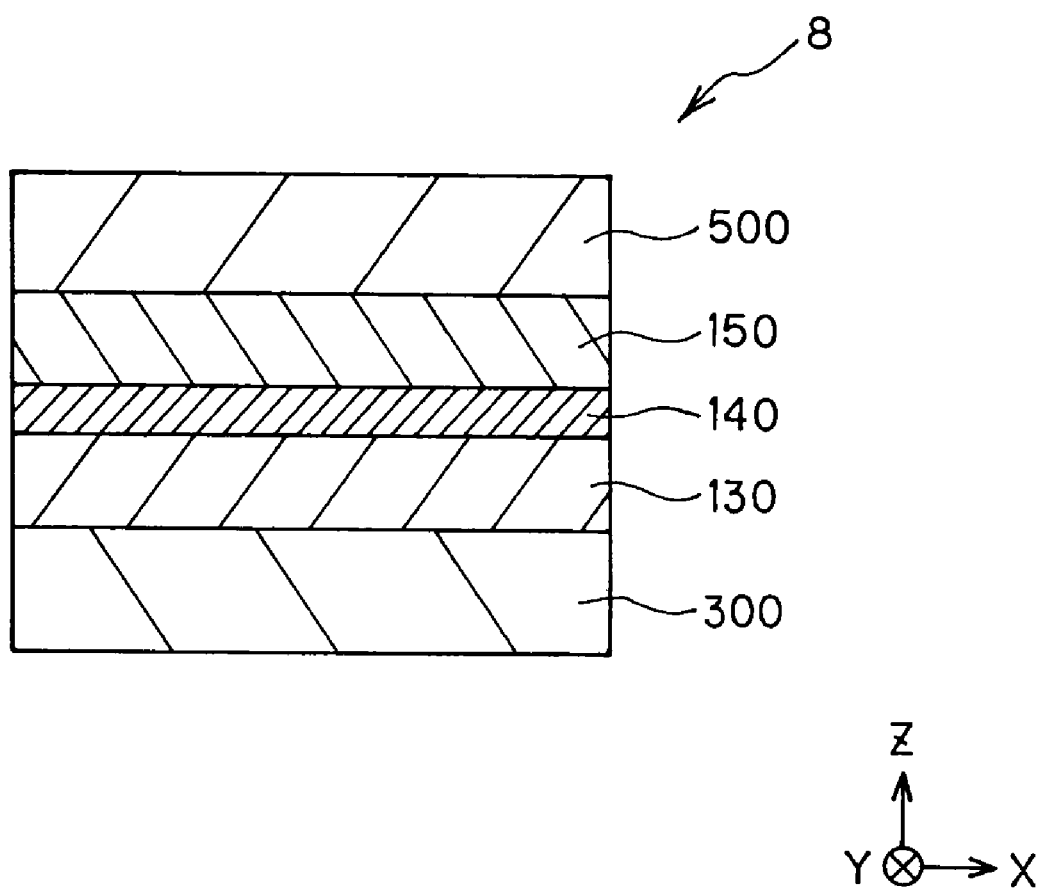
FIG. 2 is a schematically exaggerated, sectional view of the magnetoresistive unit 8 near the ABS, which is almost centrally positioned in FIG. 1.

FIG. 2 is a schematically exaggerated, sectional view of the magnetoresistive unit 8 near the ABS, which is almost centrally positioned in FIG. 1.

Figure 3:
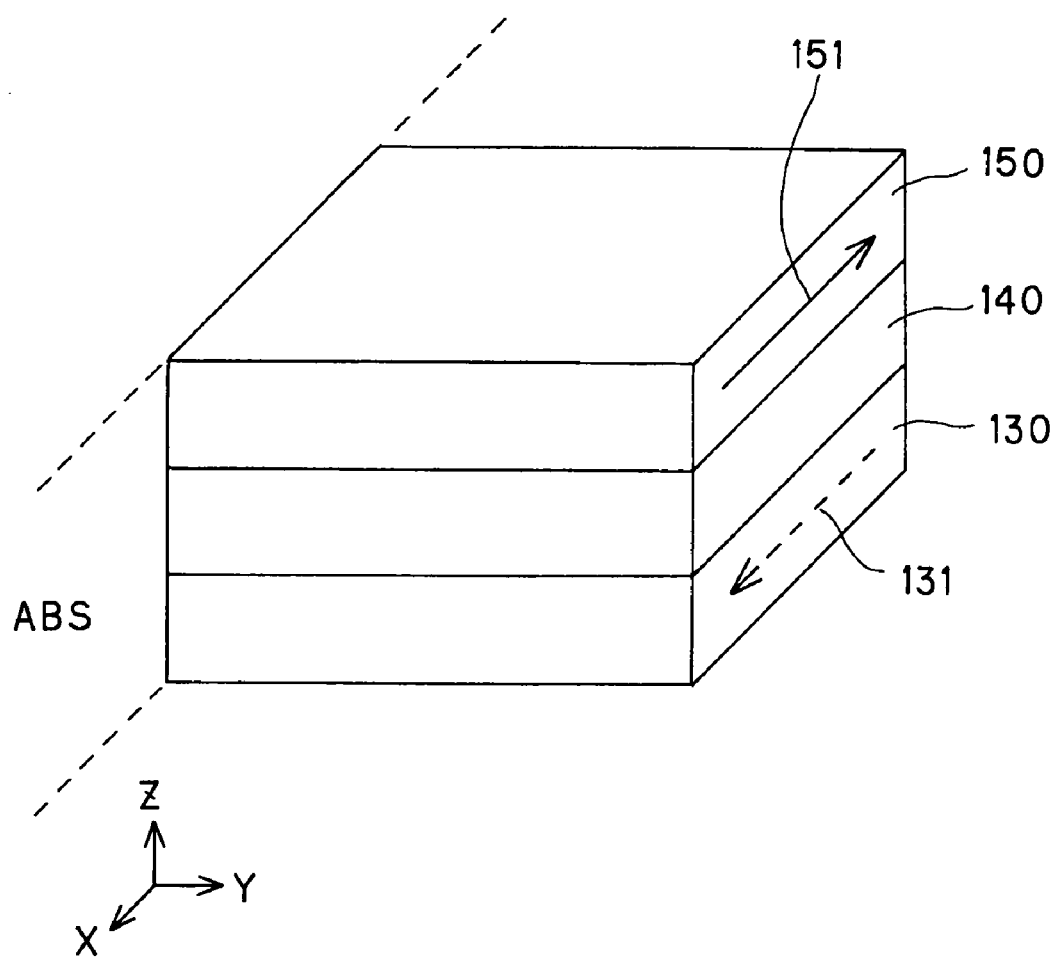
FIG. 3 is a model illustrative in perspective of part of the magnetoresistive unit 8 used on the thin-film magnetic head of the invention.

FIG. 3 is a model illustrative in perspective of part of the magnetoresistive unit 8 used on the thin-film magnetic head of the invention.

Figure 4:
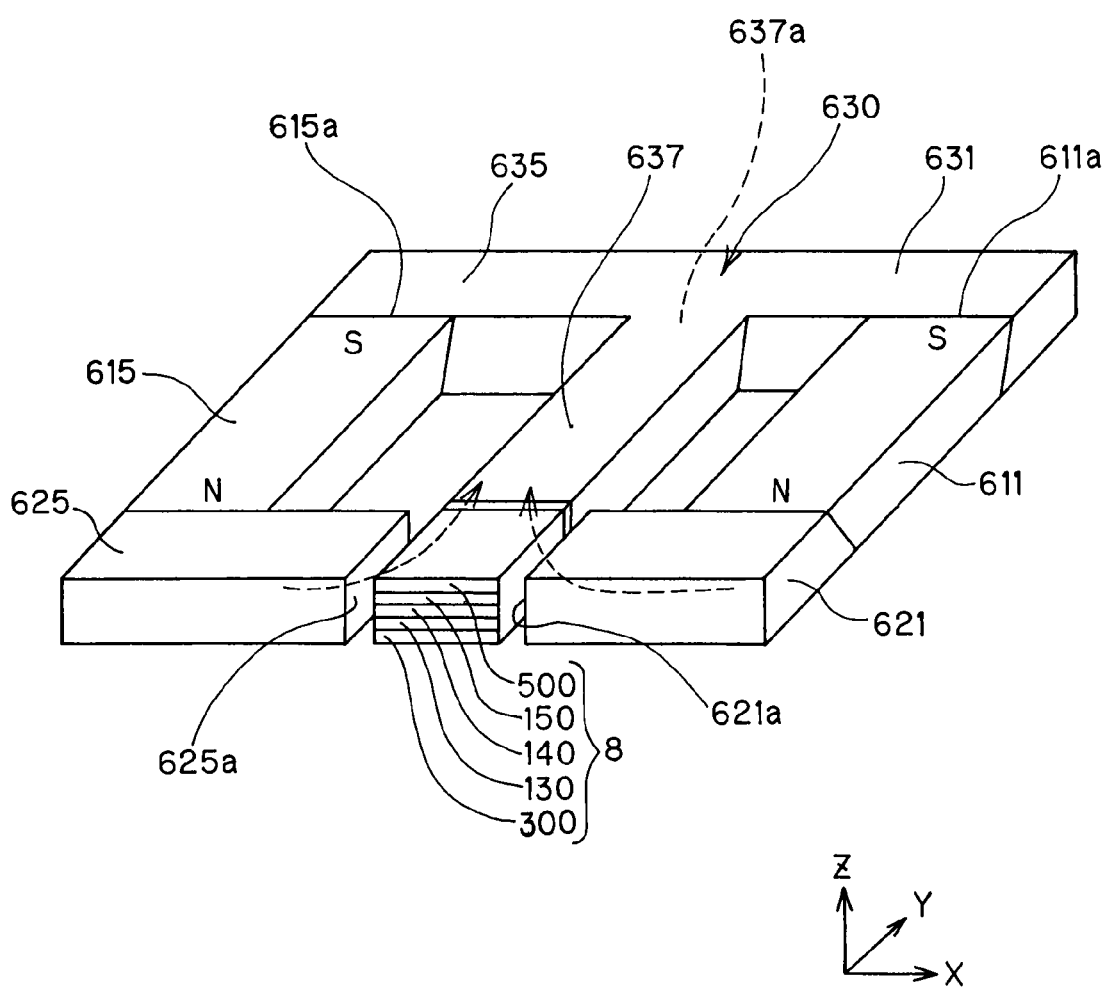
FIG. 4 is illustrative in perspective, as in FIG. 1, of a modification to the construction of the magnetoresistive device.

FIG. 4 is illustrative in perspective, as in FIG. 1, of a modification to the construction of the magnetoresistive device.

Figure 5:
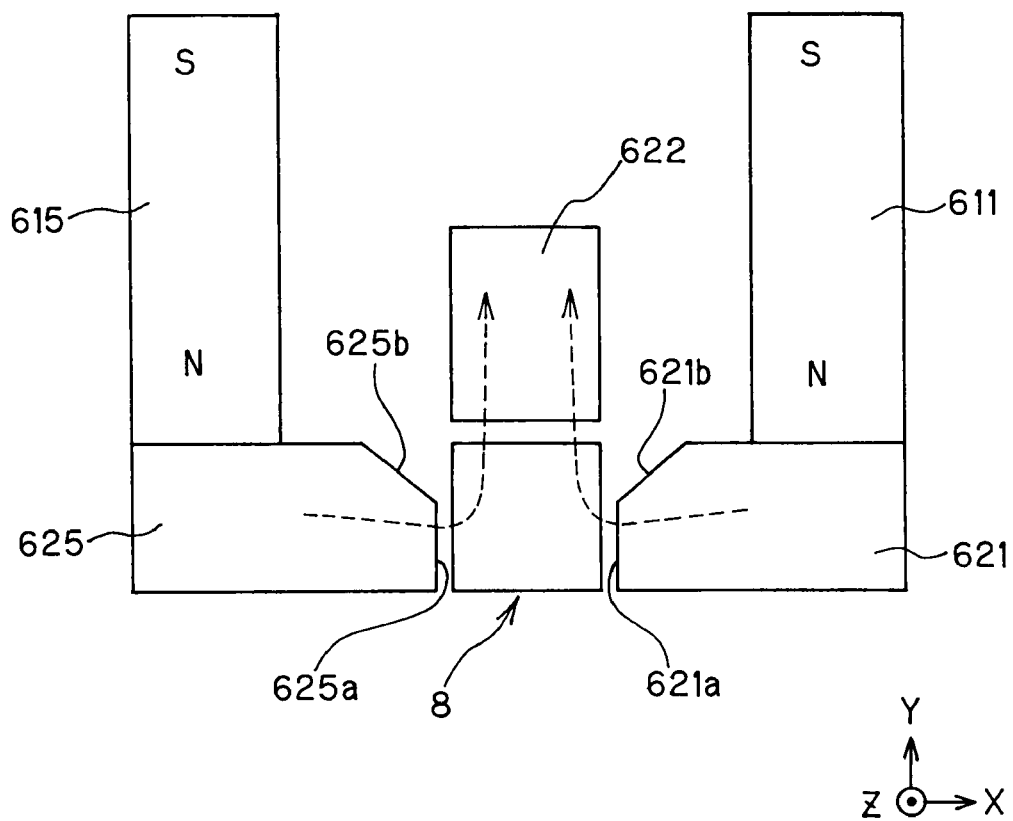
FIG. 5 is illustrative in plan of a modification to the construction of the magnetoresistive device.

FIG. 5 is illustrative in plan of a modification to the construction of the magnetoresistive device.

Figure 6A:
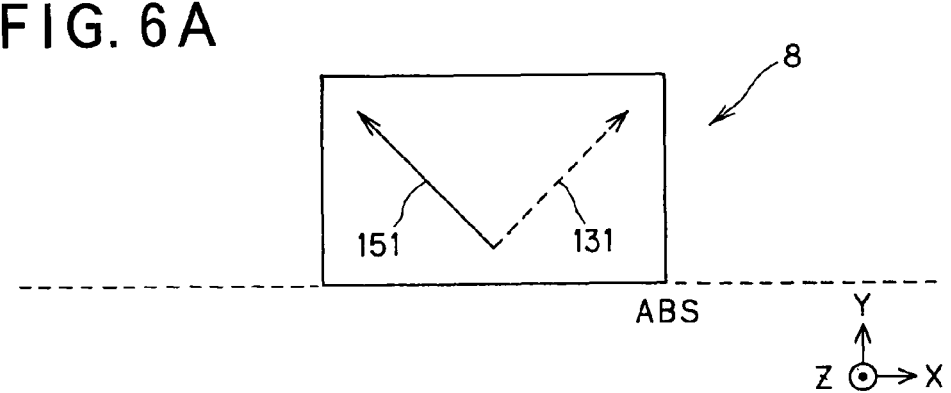
FIGS. 6A, 6B and 6C are model representations illustrative of state changes of magnetization depending on an external magnetic field, respectively, in which there are changes in the GMR effect of the thin-film magnetic head of the invention.
Figure 6B:
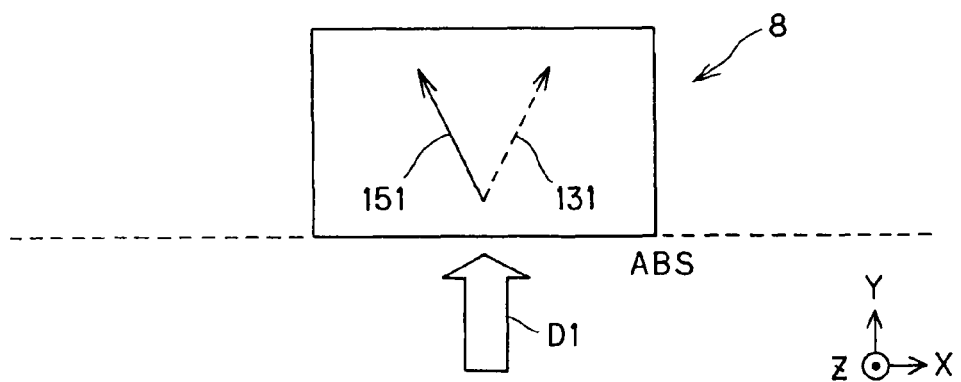
Figure 6C:
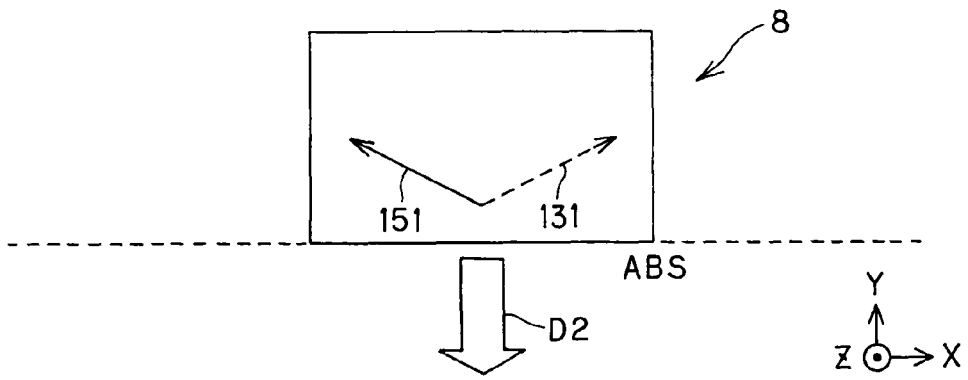

FIGS. 6A, 6B and 6C are model representations illustrative of state changes of magnetization depending on an external magnetic field, respectively, in which there are changes in the magnetoresistance effect of the thin-film magnetic head of the invention.

[Explanation of the Structure of the Magnetoresistive Device]

As shown in FIG. 1, the magnetoresistive device of the invention comprises a magnetoresistive unit 8, and an upper shield layer 5 and a lower shield layer 3 located and formed with that magnetoresistive unit 8 sandwiched between them.

The magnetoresistive unit 8 comprises a nonmagnetic metal intermediate layer 140, and a first ferromagnetic layer 130 and a second ferromagnetic layer 150 stacked together with that nonmagnetic metal intermediate layer 140 sandwiched between them. That is, there is the magnetoresistive device of the CPP (current perpendicular to plane) structure involved, with the sense current applied in that stacking direction. On the second ferromagnetic layer 150 there is a cap layer 500 formed that comprises Ta or Ru for instance, and beneath the first ferromagnetic layer 130 there is a buffer layer 300 formed that comprises Ta or Ru as an example.

In general, the upper 5 and the lower shield layer 3 also function as electrodes for a passage of the sense current. In the present disclosure, the upper 5 and the lower shield layer 3 are thus also called the upper read shield layer 5 and the lower read shield layer 3. Alternatively, another electrode layer may be added to and stacked on such shield layers 5 and 3. In order to attain one of the objects of the invention, the gap spacing defined by the spacing between the upper 5 and the lower shield layer 3 should be not greater than 30 nm.

The first 130 and the second ferromagnetic layer 150 function as the so-called free layers, and with no bias magnetic field applied to them as yet, their magnetizations are antiparallel with each other.

This antiparallel state is shown in FIG. 3: the magnetization 131 of the first ferromagnetic layer 130 and the magnetization 151 of the second ferromagnetic layer 150 are antiparallel with each other. In one example of creating antiparallelism, the magnetizations of the first 130 and the second ferromagnetic layer 150 are exchange coupled together by way of the nonmagnetic metal intermediate layer 140 so that they are antiparallel with each other. In another example of creating anti-parallelism, the magnetic actions of the first and the second shield layer may be given to the first 130 and the second ferromagnetic layer 150, respectively, thereby placing the directions of magnetization of the first 130 and the second ferromagnetic layer 150 in opposite directions.

As shown in FIG. 1, adjacent to and on both sides in the widthwise direction (X-direction) of the magnetoresistive unit 8 of the invention, a first 621 and a second side shield layer 625, one each made of a soft magnetic material, are formed, one each in interposition relation to an insulating layer having a thickness of for instance about 5 nm (drawn as a gap in FIG. 1).

Each of the first 621 and the second side shield layer 625 should have an X-direction width of about 30 to 300 nm, a Y-direction length of about 30 to 3,000 nm and a Z-direction height of about 5 to 50 nm.

Further at the rear of the first 621 and the second side shield layer 625, a first 611 and a second biasing layer 615 are disposed, respectively, in such a way as to provide a magnetic coupling to the first 621 and the second side shield layer 625.

The first 611 and the second biasing layer 615 are preferably disposed such that their N-S magnetic poles are placed in the Y-direction. It follows that the N-S poles are magnetized in the length (Y) direction. Further, the width (X-direction) of the first 611, and the second biasing layer 615 is narrower than the width (X-direction) of the first 621, and the second side shield layer 625.

As shown in FIG. 1, therefore, an L-shaped configuration is formed by the combination of the first side shield layer 621 with the first biasing layer 611. Likewise, the opposite L-shaped configuration is formed by the combination of the second side shield layer 625 with the second biasing layer 615.

The arrangement being like such, magnetic fluxes fed from the first 611 and the second biasing layer 615 pass through the first 621 and the second side shield layer 625, and are fed from the ends 621a and 625a of the first and second side shield layers 621 and 625 positioned in proximity to the magnetoresistive unit. The magnetic fluxes fed from such ends 621a and 625a work such that the magnetizations of the first 130 and the second ferromagnetic layer 150 are substantially orthogonal to each other.

The range for the substantially orthogonal intersection of the magnetizations of the first 130 and the second ferromagnetic layer 150 should be 90°±15°. Note here that it is in the state of intersection of the magnetizations 131 and 151 shown in FIG. 6A that the substantially orthogonal intersection is achieved.

In a preferable embodiment of the invention as shown in FIG. 1, there is a back yoke 622 (flux guide 622) formed in a depth side (Y-area) of the magnetoresistive unit 8, thereby facilitating the substantially orthogonal intersection of magnetizations of the first 130 and the second ferromagnetic layer 150. The presence of this back yoke 622 makes it easy for the magnetic fluxes passing through the ends 621a and 625a of the first and second side shield layers 621 and 625 in proximity to the magnetoresistive unit 8 to be fed to the depth side of the magnetoresistive unit 8 through the magnetoresistive unit 8, so that the action of the invention on the substantially orthogonal intersection of magnetizations can be effectively enhanced.

One modification to the magnetoresistive device is shown in FIG. 4.

On the depth side (Y-direction) of the magnetoresistive unit 8, there is a back yoke 637 formed, as shown in FIG. 4, and this back yoke 637 is magnetically coupled to the rear ends 611a and 615a of first and second biasing layers 611 and 615 by way of the presence to connecting yokes 631 and 635 connected to the rear ends 637a of the back yoke 637.

The arrangement being like such, a magnetic flux fed from the first biasing layer 611 passes through the first side shield layer 621, and then through the end 621a of the first side shield layer 621 positioned in proximity to the magnetoresistive unit 8. And a magnetic flux fed from the end 621a of the first side shield layer 621 passes through the magnetoresistive unit 8, back yoke 637 and connecting yoke 631, forming a closed magnetic path going back to the first biasing layer 611.

Likewise, a magnetic flux fed from the second biasing layer 615 passes through the second side shield layer 625, and then through the end 625a of the second side shield layer 625 positioned in proximity to the magnetoresistive unit 8. And a magnetic flux fed from the end 625a of the second side shield layer 625 passes through the magnetoresistive unit 8, back yoke 637 and connecting yoke 635, forming a closed magnetic path going back to the second bias magnetic-field layer 611.

Note here that there is an insulating layer having a thickness of, e.g., about 5 nm interposed between the rear end of the magnetoresistive unit 8 in the depth direction (Y-direction) and the back yoke 637.

Another modification to the magnetoresistive device is shown in FIG. 5. Although that device has much the same fundamental construction as in FIG. 1, it is understood that there is a difference as set forth below. Referring specifically to FIG. 5, for instance, there are edge cutouts 621b and 625b provided on the ends of the first and second side shield layers 621 and 625 positioned in proximity to the magnetoresistive unit 8, so that their sectional areas are much narrower. This makes sure magnetic fluxes fed from the side shield layers 621 and 625 are converged to facilitate the aforesaid orthogonal intersection of magnetizations.

[Explanation of the Material for Each of the Components That Form the Magnetoresistive Device]

The material for each of the components that form the aforesaid magnetoresistive device is now explained.

First 130 and Second Ferromagnetic Layer 150:

There is the mention of NiFe, CoFe, CoFeB, CoFeNi, $Co_2MnSi$, $Co_2MnGe$, $FeO_x$ (the oxide of Fe), $CoO_x$ (the oxide of Co, etc.

Each layer should have a thickness of about 0.5 to 8 nm.

These layers function as the so-called free layers that vary in the direction of magnetization under the influences of an externally applied magnetic field.

Nonmagnetic Metal Intermediate Layer 140:

There is the mention of Ru, Ir, Rh, Cr, Cu, Zn, Ga, ZnO, InO, $SnO_2$, $TiO_2$, GaN, ITO (indium tin oxide), etc.

The layer should have a thickness of about 0.5 to 5 nm.

Upper 5 and Lower Shield Layer 3:

There is the mention of NiFe, CoZrTa, sendust, NiFeCo, CoZrNb, etc.

Each layer should have a thickness of about 20 nm to 3 μm.

First 621 and Second Side Shield Layer 625:

There is the mention of NiFe, CoZrTa, sendust, NiFeCo, CoZrNb, etc.

Each layer should have a thickness of about 5 nm to 50 nm.

Similar arrangements are also applied to the back yoke 622 (flux guide 622), back yoke 637, and connecting yokes 631, 635 that may function in association with the first and second side shield layers 621 and 625.

First 611 and Second Biasing Layer 615:

For instance, use is made of a hard magnetic layer (hard magnet), or a stacked ferromagnetic layer and anti-ferromagnetic layer combination. Specifically, the former includes CoPt or CoCrPt, and the latter includes a stacked CoFe and IrMn combination. Note here that Cr, CrTi or the like may be used as the underlay layer for the hard magnetic layer, and the underlay layer may have the C axis (axis of easy magnetization) of hexagonal CoCrPt laid in the plane.

[Explanation of How the Magnetoresistive Device Works]

How the inventive magnetoresistive device works is now explained with reference to FIGS. 1 and 3 as well as FIGS. 6A, 6B and 6C.

With no applied bias magnetic field as yet, the first 130 and the second ferromagnetic layer 150 have their magnetizations 131 and 151 antiparallel with each other, as shown in FIG. 3. For instance, such magnetizations 131 and 151 are exchange coupled together by way of the nonmagnetic metal intermediate layer 140 such that they are antiparallel with each other.

The arrangement being like such, as shown in FIG. 1, magnetic fluxes fed from the first 611 and the second biasing layer 615 each pass through the first 621 and the second side shield layer 625 and then through the ends 621a and 625a of the first and second side shield layers 621 and 625 positioned in proximity to the magnetoresistive unit 8. The magnetic fluxes fed from such ends 621a and 625a allow the magnetizations of the first 130 and the second ferromagnetic layer 150 to be substantially orthogonal to each other, creating the state shown in FIG. 6A. This state is an initial one for the magnetoresistive device (magnetoresistive unit 8).

Upon detection of an external magnetic field D1 in a direction from the ABS toward the device side as shown in FIG. 6B, the magnetizations 131 and 151 of the first 130 and the second ferromagnetic layer 150 can align in the same direction, resulting in a decrease in the resistance of the device.

Upon detection of an external magnetic field D2 in a direction away from the ABS as shown in FIG. 6C, on the other hand, the magnetizations 131 and 151 of the first 130 and the second ferromagnetic layer 150 can lie in the opposite directions, resulting in an increase in the resistance of the device.

By measuring a series of resistance changes depending on such external magnetic fields, it is possible to detect the external magnetic field.

[Explanation of the Whole Structure of the Thin-Film Magnetic Head]

FIG. 7 is illustrative in section (section in the Y-Z plane) of a thin-film magnetic head parallel with the so-called air bearing surface (ABS).

A thin-film magnetic head 100 shown in FIG. 7 is used on a magnetic recording system such as a hard disk drive for the purpose of applying magnetic processing to a recording medium 10 like a hard disk moving in a medium travel direction M.

For instance, the thin-film magnetic head 100 illustrated in the drawing is a composite type head capable of implementing both recording and reproducing as magnetic processing. The structure comprises, as shown in FIG. 7, a slider substrate 1 made of a ceramic material such as AlTiC ($Al_2O_3$.TiC), and a magnetic head unit 101 formed on the slider substrate 1.

The magnetic head unit 101 has a multilayer structure comprising a reproducing head portion 100A adapted to implement reproducing process for magnetic information recorded by making use of the GMR effect and a shield type recording head portion 100B adapted to implement a perpendicular recording type recording processing.

A detailed account is now given below.

A first shield layer 3 and a second shield layer 5 are each a planar layer formed in such a way as to be almost parallel with the side 1a of the slider substrate 1, forming a part of the ABS that is a medium opposite surface 70.

A magnetoresistive unit 8 is disposed in such a way as to be held between the first 3 and the second shield layer 5, forming a part of the medium opposite surface 70. And a height in the perpendicular direction (Y-direction) to the medium opposite surface 70 defines an MR height (MR-h).

For instance, the first 3 and the second shield layer 5 are each formed by pattern plating inclusive of frame plating or the like.

The magnetoresistive unit 8 is a multilayer film formed in such a way as to be almost parallel with the side 1a of the slider substrate 1, forming a part of the medium opposite surface 70.

The magnetoresistive unit 8 is a multilayer film of the current-perpendicular-to-plane type (CPP type) with a sense current passing in the direction perpendicular to the staking plane.

As shown in FIG. 7, between the second shield layer 5 and the recording head portion 100B there is an inter-shield layer 9 formed that is made of a similar material as the second shield layer 5 is.

The inter-shield layer 9 keeps the magnetoresistive unit 8 functioning as a sensor out of a magnetic field occurring from the recording head 100B, taking a role in prevention of extraneous noises upon reading. Between the inter-shield layer 9 and the recording head portion 100B there may also be a backing coil portion formed. The backing coil portion is to generate a magnetic flux that cancels out a magnetic flux loop that is generated from the recording head portion 100B, passing through the upper and lower electrode layers of the magnetoresistive unit 8: this backing coil portion works to hold back the wide adjacent track erasure (WATE) phenomenon that is unwanted writing or erasure operation with the magnetic disk.

At a gap between the first and second shield layers 3 and 5 on the side of the magnetoresistive unit 8 that faces away from the medium opposite surface 70, in the rear of the first and second shield layers 3, 5 and the inter-shield shield layer 9 that face away from the medium opposite surface 7, at a gap between the first shield layer 3 and the slider substrate 1, and at a gap between the inter-shield layer 9 and the recording head portion 100B, there are insulating layers 4 and 44 formed, each one made of alumina or the like.

The recording head portion 100B is preferably constructed for the purpose of perpendicular magnetic recording, and comprises a main magnetic pole layer 15, a gap layer 18, a coil insulating layer 26, a coil layer 23 and an auxiliary magnetic pole layer 25, as shown in FIG. 7. Of course, the recording head portion 100B may be changed from the perpendicular recording type to a longitudinal recording type.

The main magnetic pole layer 15 is set up as a magnetic guide path for guiding a magnetic flux induced by the coil layer 23 to the recording layer of a magnetic recording medium 10 with information being to be written on it while converging that magnetic flux. At the end of the main magnetic pole layer 15 here that is on the medium opposite surface 70 side, the width in the track width direction (along the X-axis of FIG. 7) and thickness in the stacking direction (along the Z-axis of FIG. 7) of the main magnetic pole layer should preferably be less than those of the rest. Consequently, it is possible to generate a fine yet strong writing magnetic flux well fit for high recording densities.

The end on the medium opposite surface 70 side of the auxiliary magnetic pole layer 25 magnetically coupled to the main magnetic pole layer 15 forms a trailing shield portion having a layer section wider than that of the rest of the auxiliary magnetic pole layer 25. As shown in FIG. 7, the auxiliary magnetic pole layer 25 is opposed to the end of the main magnetic pole layer 15 on the medium opposite surface 70 side while the gap layer 18 made of an insulating material such as alumina and the coil insulating layer 26 are interposed between them.

By the provision of such auxiliary magnetic pole layer 25, it is possible to make steeper a magnetic field gradient between the auxiliary magnetic pole layer 25 and the main magnetic pole layer 15 near the medium opposite surface 70. Consequently, jitters of signal outputs diminish, resulting in the ability to minimize error rates upon reading.

The auxiliary magnetic pole layer 25, for instance, is formed at a thickness of, e.g., about 0.5 to 5 µm using frame plating, sputtering or the like. The material used may be an alloy comprising two or three of, for instance, Ni, Fe and Co, or comprising them as a main component with the addition of given elements to it.

The gap layer 18 is formed in such a way as to space the coil layer 23 away from the main magnetic pole layer 15. The gap layer 18 is constructed from $Al_2O_3$, DLC (diamond-like carbon) or the like having a thickness of, for instance, about 0.01 to 0.5 µm, and formed using, for instance, sputtering, CVD or the like.

[Explanation of the Head Gimbal Assembly and the Hard Disk System]

One each example of the head gimbal assembly and the hard disk system, used with the foregoing thin-film head mounted on it, is now explained.

A slider 210 included in the head gimbal assembly is first explained with reference to FIG. 8. In the hard disk system, the slider 210 is located in such a way as to face a hard disk that is a rotationally driven disk-form recording medium. This slider 210 primarily comprises a substrate 211 built up of a substrate and an overcoat.

The substrate 211 is in a generally hexahedral shape. Of the six surfaces of the substrate 211, one surface is in opposition to the hard disk. On that one surface there is the air bearing surface 70 formed.

Figure 8:
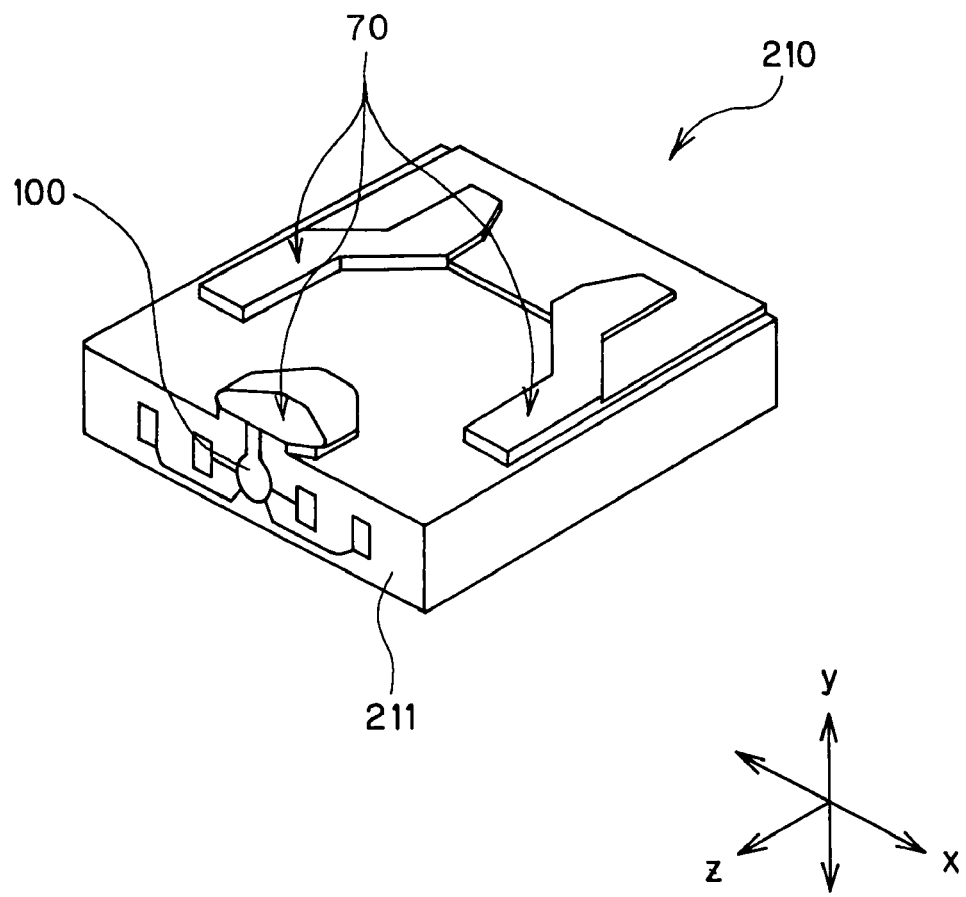
FIG. 8 is illustrative in perspective of the slider included in the head gimbal assembly according to one embodiment of the invention.

As the hard disk rotates in the z-direction in FIG. 8, it causes an air flow passing between the hard disk and the slider 210 to induce lift relative to the slider 210 in the downward y-direction in FIG. 8. This lift in turn causes the slider 210 to levitate over the surface of the hard disk. Note here that the x direction in FIG. 8 traverses tracks on the hard disk.

Near the end of the slider 210 on an air exit side (the left lower end in FIG. 8), there is a thin-film magnetic head formed according to the embodiment here.

A head gimbal assembly 220 according to this embodiment is now explained with reference to FIG. 9. The head gimbal assembly 220 comprises a slider 210 and a suspension 221 adapted to resiliently support that slider 210. The suspension 221 comprises a leaf spring-form load beam 222 made of typically stainless steel, a flexure 223 attached to one end of the load beam 222 and having the slider 210 joined to it for giving a suitable degree of flexibility to the slider 210, and a base plate 224 attached to the other end of the load beam 222.

The base plate 224 is adapted to be attached to an arm 230 of an actuator for moving the slider 210 in the track traverse direction x of the hard disk 262. The actuator comprises the arm 230 and a voice coil motor for driving that arm 230. At a portion of the flexure 223 having the slider 210 attached to it, there is a gimbal portion provided for keeping the posture of the slider 210 constant.

The head gimbal assembly 220 is attached to the arm 230 of the actuator. The head gimbal assembly 220 attached to one arm 230 is called a head arm assembly, whereas the head gimbal assembly 220 attached to a carriage at its plurality of arms is referred to as a head stack assembly.

Figure 9:
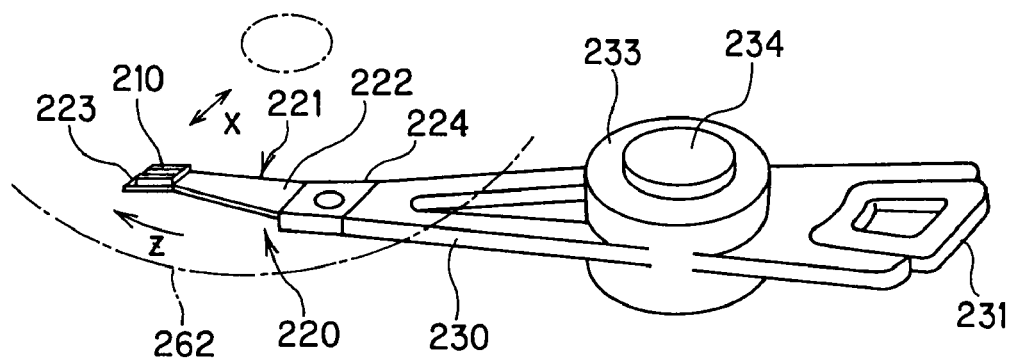
FIG. 9 is illustrative in perspective of the head arm assembly including the head gimbal assembly according to one embodiment of the invention.

FIG. 9 illustrates one example of the head arm assembly, wherein the head gimbal assembly 220 is attached to one end of the arm 230. To the other end of the arm 230, a coil 231 forming a part of the voice coil motor is attached. Halfway across the arm 230, there is a bearing portion 233 attached to a shaft 234 adapted to support the arm 230 in a pivotal fashion.

One each example of the head stack assembly and the hard disk system according to the embodiment here are now explained with reference to FIGS. 10 and 11.

Figure 10:
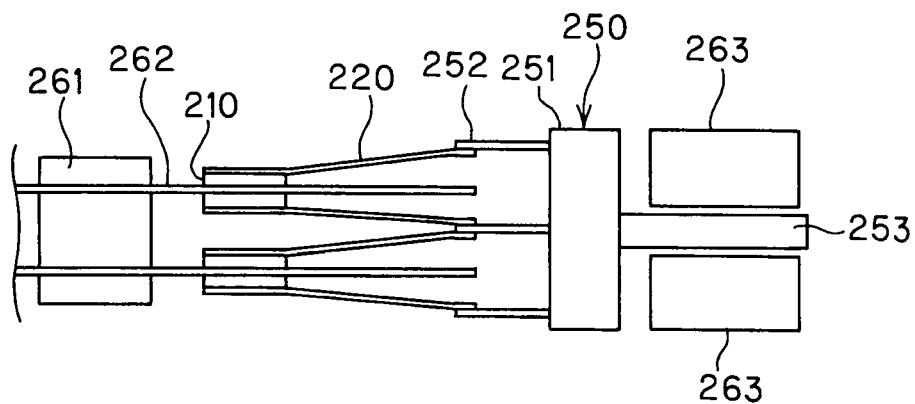
FIG. 10 is illustrative of part of the hard disk system according to one embodiment of the invention.
Figure 11:
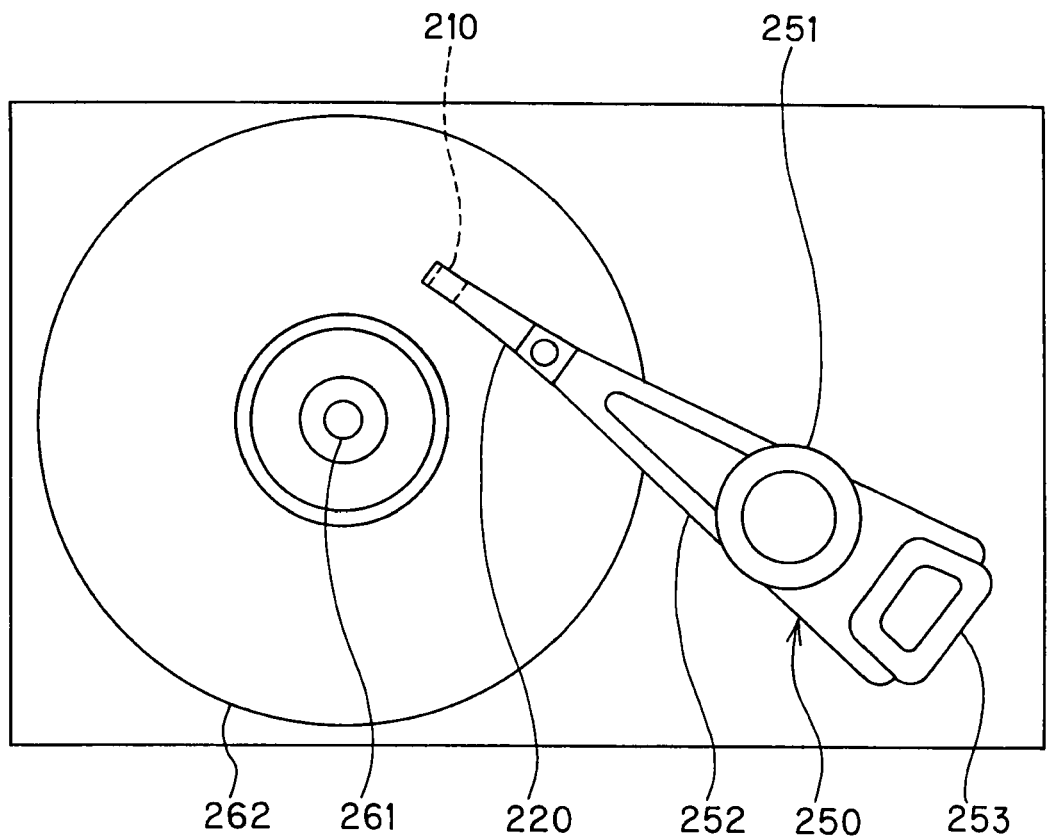
FIG. 11 is a plan view of the hard disk system according to one embodiment of the invention.
Figure 12:
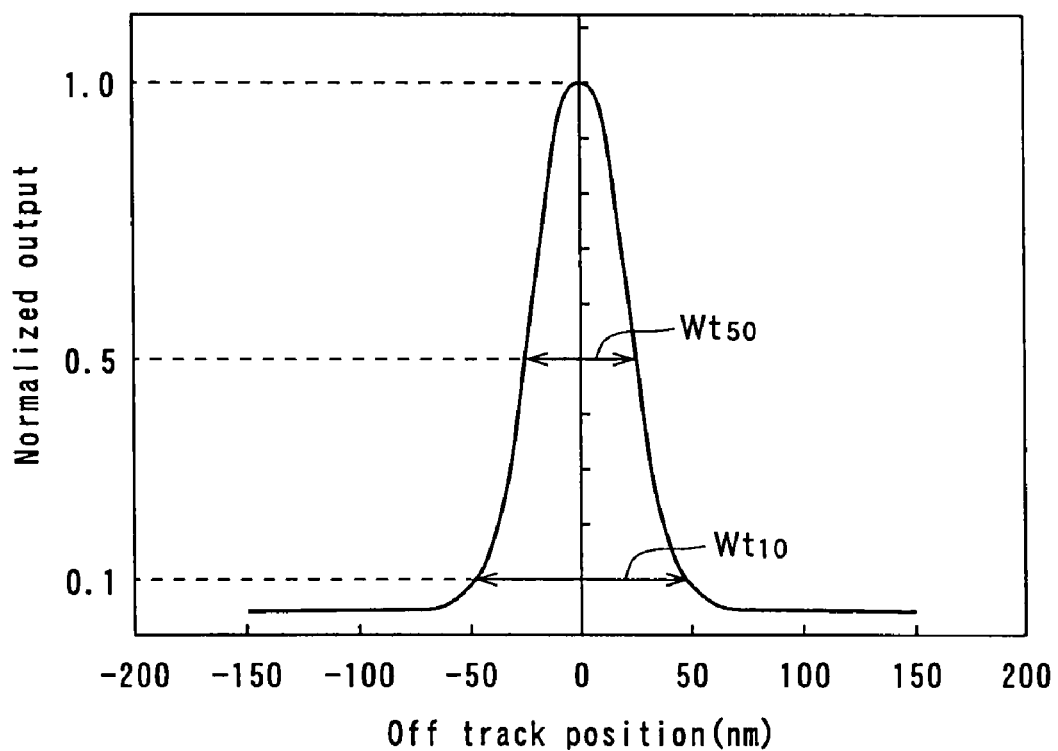
FIG. 12 is a graph indicative of signal read performance.

FIG. 10 is illustrative of part of the hard disk system, and FIG. 12 is a plan view of the hard disk system.

A head stack assembly 250 comprises a carriage 251 having a plurality of arms 252. The plurality of arms 252 are provided with a plurality of the head gimbal assemblies 220 such that they line up perpendicularly at an interval. On the side of the carriage 251 that faces away from the arms 252, there is a coil 253 attached, which coil becomes a part of the voice coil motor. The head stack assembly 250 is incorporated in the hard disk system.

The hard disk system comprises a plurality of hard disks 262 attached to a spindle motor 261. For each hard disk 262, two sliders 210 are located such that they are opposite to each other with the hard disk 262 held between them. The voice coil motor has also permanent magnets 263 located at opposite positions with the coil 253 of the head stack assembly 250 held between them.

The head stack assembly 250 except the slider 210 and the actuator correspond to the positioning device here which is operable to support the slider 210 and position it relative to the hard disk 262.

With the hard disk system here, the actuator is actuated to move the slider 210 in the track traverse direction of the hard disk 262, thereby positioning the slider 210 with respect to the hard disk 262. The thin-film magnetic head incorporated in the slider 210 works such that information is recorded by a recording head in the hard disk 262, and the information recorded in the hard disk 262 is played back by a reproducing head.

The head gimbal assembly and the hard disk system here have pretty much the same action as the thin-film magnetic head according to the foregoing embodiment.

While the embodiment here has been described with reference to the thin-film magnetic head of the structure wherein the reproducing head is located on the substrate side and the perpendicular recording head is stacked on the reproducing head, it is contemplated that that order of stacking could be reversed. When the thin-film magnetic head here is used as a read-only head, the recording head could be removed from it.

EXPERIMENTAL EXAMPLE

The invention is now explained in further details with reference to some specific examples of the inventive magnetoresistive device.

Experimental Example 1

Sample Preparation for Example 1

An experimental sample (the sample of Example 1) for the magnetoresistive device set up as shown in FIG. 1 was prepared.

That is, the magnetoresistive unit 8 having a multilayer structure set out in Table 1, given below, was formed on the lower shield layer 3 made of NiFe (X-, Y- and Z-axis direction dimensions of 30 μm, 30 μm and 1 μm, respectively), and an insulating layer made of MgO was formed on each side of the device including the magnetoresistive unit 8. Then, the first 621 and the second side shield layer 625 (X-, Y- and Z-axis direction dimensions of 100 nm, 50 nm and 10 nm, respectively), one each made of NiFe, were formed adjacent to the magnetoresistive unit 8 via such insulating films.

Thereafter, the first 611 and the second biasing layer 615 (X-, Y- and Z-axis direction dimensions of 50 nm, 500 nm and 10 nm, respectively), one each made of CoCrPt, were formed on the first 621 and the second side shield layer 625 in such an L-shape configuration as shown in FIG. 1.

Further, on that the upper shield layer 5 (X-, Y- and Z-axis direction dimensions of 30 μm, 18 μm and 1 μm, respectively) made of NiFe was formed via a nonmagnetic layer.

Thus, the sample of Example 1 was prepared.

TABLE 1

| Multilayer Structure | | Layer Material | Thickness (nm) |
|---|---|---|---|
| | Cap Layer (500) | Ru (upper)/Ta (lower) | 3.0/2.0 |
| Sensor Area | Second Ferromagnetic Layer (150) | CoFe | 3.0 |
| | Nonmagnetic Intermediate Layer (140) | Cu/ZnO/Cu | 3.0 (Total) |
| | First Ferromagnetic Layer (130) | CoFe | 3.0 |
| Buffer Layer (300) | | Ta (upper)/Ru (lower) | 2.0/3.0 |

Sample Preparation for Example 2

In addition to the aforesaid sample configuration for Example 1, the yoke 622 (X-, Y- and Z-axis direction dimensions of 50 nm, 450 nm and 10 nm, respectively) was formed at the rear (depth side) of the magnetoresistive unit 8 via an insulating layer, as shown in FIG. 1, to prepare the sample of Example 2.

Sample Preparation for Example 3

In addition to the aforesaid sample configuration of Example 1, the back yoke 637 and connecting yokes 631, 635 were formed at the rear (depth side) of the magnetoresistive unit 8 via an insulating layer, as shown in FIG. 4, to prepare the sample of Example 3 forming the so-called closed magnetic path.

Sample Preparation for Example 4

The aforesaid sample configuration of Example 2 was modified to prepare the sample of Example 4 having a structure capable of concentrating a magnetic flux at the ends of the side shields, as shown in FIG. 5.

Sample Preparation for Comparative Example 1

Figure 13:
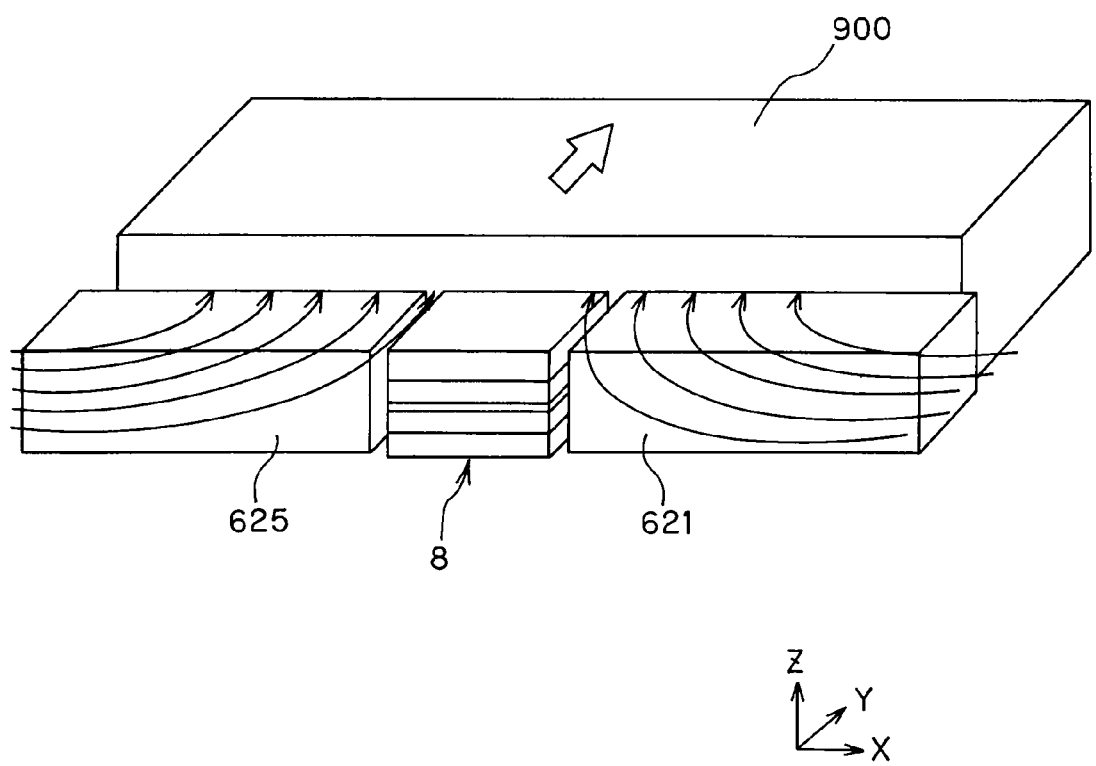
FIG. 13 is a perspective view of the structure of part of the sample of Comparative Example 1.
Figure 14:
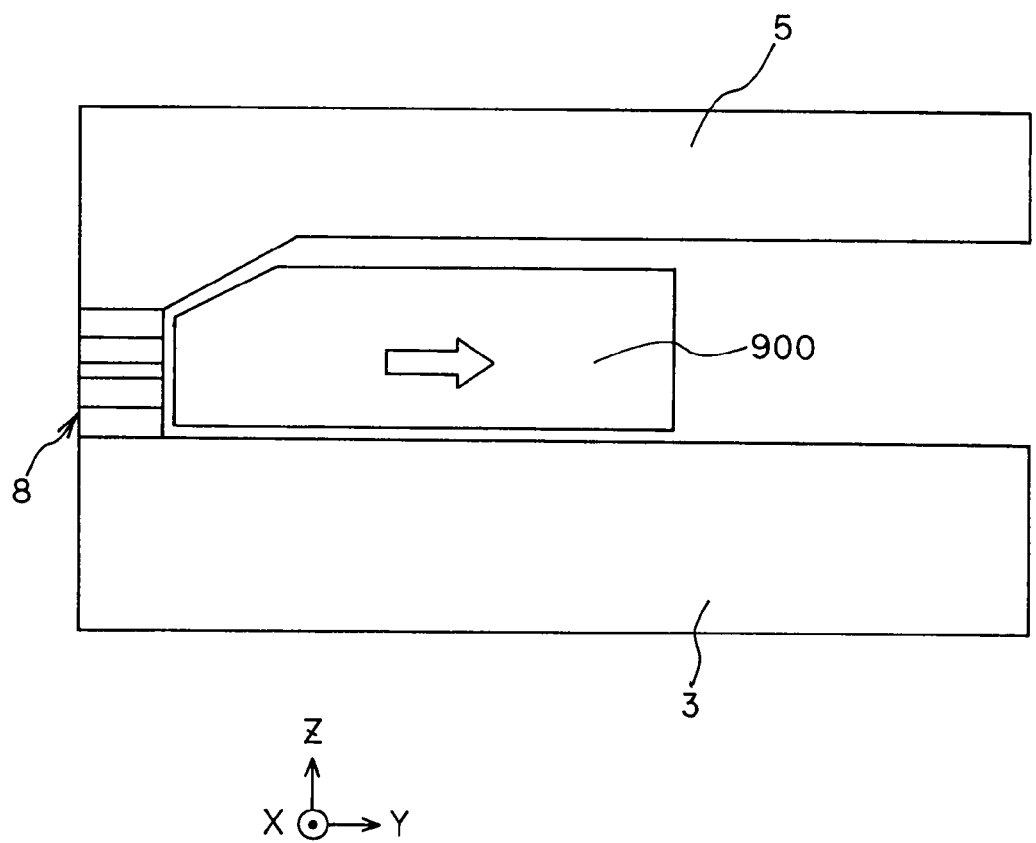
FIG. 14 is a sectional view of FIG. 13.
Figure 15:
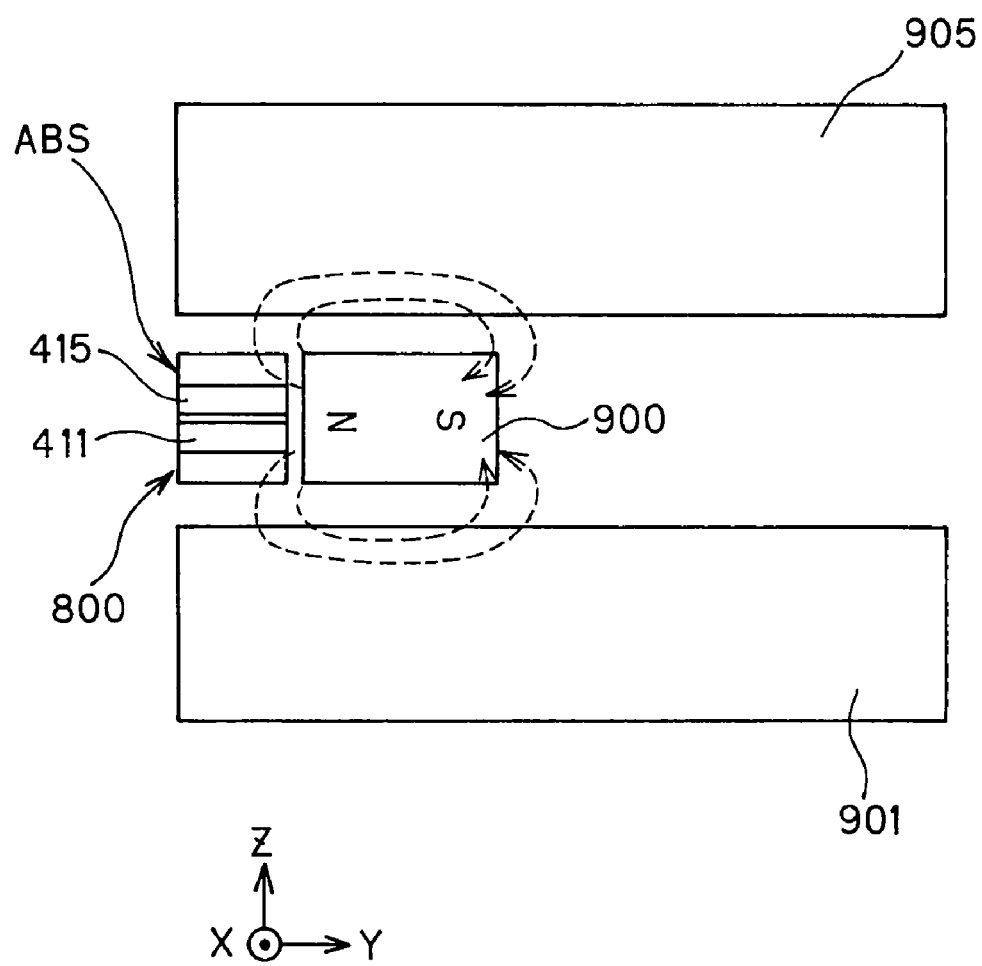
FIG. 15 is a sectional view of part of a prior art device.

In the aforesaid sample configuration of Example 1, the first 621 and the second side shield layer 625 were left intact and instead of the first 611 and the second biasing layer 615, one such a large hard magnet as shown in FIGS. 13 and 14 (X-, Y- and Z-axis direction dimensions of 500 nm, 500 nm and 15 nm, respectively) was formed at the rear of the magnetoresistive unit 8 and the first and second side shield layers 621, 625 to prepare the sample for Comparative Example 1.

The sample of Comparative Example 1 is in a form wherein the first and second side shield layers 621 and 625 are added to the prior art arrangement of use. As can be seen from FIGS. 13 and 14, when the side shields are added to the prior art, a larger hard magnet is needed because of a decline of the efficiency of turning the magnetizations of the free layers in the magnetoresistive unit.

Sample Preparation for Comparative Example 2

In the aforesaid sample configuration of Comparative Example 1, the first and second side shield layers 621 and 625 were removed. Otherwise, the sample of Comparative Example 2 was prepared in the same manner as in Comparative Example 1. The sample of Comparative Example 2 is similar in the form of use to the prior art known so far in the art.

The aforesaid samples of Examples 1 to 4 as well as the samples of Comparative Examples 1 and 2 were estimated in terms of the performance of reading signals from the medium in the following way.

Signal Read Performance

A micro-track (with a track width=15 nm: this figure refers to a magnetic width and is usually on the order of 40% of the optical track width of an MR device) was formed on the medium, and an output was detected while moving each of the aforesaid device samples in the track direction, thereby measuring such a signal read performance profile as shown in FIG. 12.

The sharper the rising of the profile shown in FIG. 12, the less interference from neighboring bits is: the better the sample performs as a read head. Estimation was made using the values of $W_{t50}/W_{t10}$ where $W_{t10}$ is a read head width at which 10% of the output is obtained and $W_{t50}$ is a read head width at which 50% of the output is obtained. The smaller the figure, the sharper the rising of the profile of signal read performance is: the better the sample performs as a read head.

The results are tabulated below.

TABLE 2

| Sample No. | $W_{t50}$ | $W_{t10}$ | $W_{t50}/W_{t10}$ |
|---|---|---|---|
| Ex. 1 | 34 | 59 | 1.74 |
| Ex. 2 | 34 | 57 | 1.68 |
| Ex. 3 | 34 | 57 | 1.68 |
| Ex. 4 | 34 | 58 | 1.71 |
| Comp. Ex. 1 | 35 | 66 | 1.85 |
| Comp. Ex. 2 | 36 | 71 | 1.97 |

As can be appreciated from what is set out in Table 2, Examples 1 to 4 of the invention have a decreased value of $W_{t50}/W_{t10}$, indicating that there is a head construction of good enough signal read performance achievable.

In Comparative Example 1 wherein such a large hard magnet as shown in FIGS. 13 and 14 is used instead of the first and second biasing layers 611 and 615, and Comparative Example 1 wherein the first and second side shield layers 621 and 626 are removed, by contrast, the rising of the signal read performance profile is not that sharp, indicating that there is a head construction of poor signal read performance obtained.

According to such construction of the invention of this application, it has been found that the rising of signal read performance profiles is so sharp that the recording density can effectively be increased. Further, upon the application of biases according to the construction of the invention, it has been found that there are output signals of linearity achievable, indicating that magnetic moments could have been controlled at the desired angle with respect to two free layers.

With Comparative Examples 1 and 2, there is some problem with the linearity of output signals.

From the aforesaid results, the advantages of the invention would be undisputed.

That is, the invention provides a magnetoresistive device of the CPP (current perpendicular to plane) structure comprising a magnetoresistive unit, and an upper shield layer and a lower shield layer located and formed such that the magnetoresistive unit is held between them, with a sense current applied in the stacking direction, wherein said magnetoresistive unit comprises a nonmagnetic metal intermediate layer, and a first ferromagnetic layer and a second ferromagnetic layer stacked and formed such that the nonmagnetic metal intermediate layer is held between them wherein, with no bias magnetic field applied as yet, said first ferromagnetic layer and second ferromagnetic layer have mutually antiparallel magnetizations; said magnetoresistive unit has a first side shield layer and a second side shield layer adjacent to both its widthwise sides, one each via an insulating layer; and at rear sites of said first and second side shield layers, first and second biasing layers are located in such a way as to be magnetically coupled to the first and second side shield layers, wherein magnetic fluxes fed from the first and second biasing layers pass through the first and second side shield layers, respectively, and then through the ends of the first and second side shield layers positioned in proximity to the magnetoresistive unit so that magnetic fluxes fed from said ends work such that the magnetizations of said first ferromagnetic layer and second ferromagnetic layer are substantially orthogonal to each other. It is thus possible to adopt the structure capable of narrowing down the read gap (the gap between the upper and the lower shield) to meet recent mounting demands for ultra-high recording densities. In addition, stable bias magnetic fields can be applied by way of a simplified structure, and moreover, interferences from neighboring bits can be kept in check to make the magnetic signal profile so sharp that the effective device width can be narrowed down for the normal reading of magnetic signals.

INDUSTRIAL APPLICABILITY

The present invention can be applied to the industry of magnetic disk systems comprising a magnetoresistive device to read as signals the magnetic intensity of magnetic recording media or the like.

What we claim is:

1. A magnetoresistive device with a CPP (current perpendicular to plane) structure comprising a magnetoresistive unit, and an upper shield layer and a lower shield layer located and formed such that the magnetoresistive unit is held between them, with a sense current applied in a stacking direction, wherein:
    said magnetoresistive unit comprises a nonmagnetic metal intermediate layer, and a first ferromagnetic layer and a second ferromagnetic layer stacked and formed such that the nonmagnetic metal intermediate layer is held between them,
    with no bias magnetic field applied as yet, said first ferromagnetic layer and second ferromagnetic layer have mutually antiparallel magnetizations,
    said magnetoresistive unit has a first side shield layer and a second side shield layer adjacent to both its widthwise sides, one each via an insulating layer, and
    at rear sites of said first and second side shield layers, first and second biasing layers are located in such a way as to be magnetically coupled to the first and second side shield layers, characterized in that:

magnetic fluxes fed from the first and second biasing layers pass through the first and second side shield layers, respectively, and then through the ends of the first and second side shield layers positioned in proximity to the magnetoresistive unit so that magnetic fluxes fed from said ends work such that the magnetizations of said first ferromagnetic layer and second ferromagnetic layer are substantially orthogonal to each other.

2. The magnetoresistive device according to claim 1, wherein on a depth side of said magnetoresistive unit, there is a back yoke (flux guide) formed, enabling the substantially orthogonal magnetizations of said first and second ferromagnetic layers to be more effectively achieved, and the presence of said back yoke makes it possible for the magnetic fluxes fed from the ends of said first and second side shield layers positioned in proximity to the magnetoresistive unit to pass through the magnetoresistive unit to the depth side of the magnetoresistive unit.

3. The magnetoresistive device according to claim 1, wherein said first and second biasing layers each have an N-S pole magnetized in a length direction.

4. The magnetoresistive device according to claim 1, wherein on a depth side of said magnetoresistive unit there is a back yoke formed wherein said back yoke is magnetically coupled to the rear ends of the first and second biasing layers by way of the presence of a connecting yoke connected to the rear end of said back yoke, and the magnetic fluxes fed from the first and second biasing layers pass through the first and second side shield layers, respectively, and then through the ends of the first and second side shield layers positioned in proximity to the magnetoresistive unit, and the magnetic fluxes fed from the ends of said first and second side shield layers pass through the magnetoresistive unit, back yoke and connecting yoke, respectively, forming a closed magnetic path going back to the first and second biasing layers.

5. The magnetoresistive device according to claim 1, wherein each of the ends of said first and second side shield layers positioned in proximity to the magnetoresistive unit is configured in a shape having a narrowed sectional area to converge the fed magnetic flux.

6. The magnetoresistive device according to claim 1, wherein a gap spacing defined by a gap between said upper shield layer and said lower shield layer is up to 30 nm.

7. The magnetoresistive device according to claim 1, wherein the substantially orthogonal magnetizations of said first ferromagnetic layer and second ferromagnetic layer occur in the range of $90°\pm15°$.

8. The magnetoresistive device according to claim 1, wherein said first and second biasing layers have a width (X-direction) narrower than that (X-direction) of said first and second side shield layers.

9. A thin-film magnetic head, characterized by comprising:
a medium opposite plane in opposition to a recording medium, and
a magnetoresistive device as recited in claim 1, which is located near said medium opposite plane to detect a signal magnetic field from said recording medium.

10. A head gimbal assembly, characterized by comprising:
a slider that includes a thin-film magnetic head as recited in claim 9 and is located in opposition to a recording medium, and
a suspension adapted to resiliently support said slider.

11. A magnetic disk system, characterized by comprising:
a slider that includes a thin-film magnetic head as recited in claim 9 and is located in opposition to a recording medium, and
a positioning device adapted to support and position said slider with respect to said recording medium.

* * * * *